United States Patent [19]
Adelstein

[11] 3,917,615
[45] Nov. 4, 1975

[54] 1,1-DIARYL-1-OXADIAZOL-ALKYLAMINES

[75] Inventor: Gilbert W. Adelstein, Evanston, Ill.

[73] Assignee: G. D. Searle & Co., Chicago, Ill.

[22] Filed: Apr. 1, 1974

[21] Appl. No.: 456,755

[52] U.S. Cl...260/293.54; 260/247.5 R; 260/293.67; 260/296 R; 260/296 B; 260/307 G; 260/308 D; 424/248; 424/263; 424/267; 424/269

[51] Int. Cl............................................ C07d 85/54

[58] Field of Search... 260/247.5 R, 293.54, 293.67, 260/296 R, 296 B, 307 G

[56] References Cited
UNITED STATES PATENTS

| | | | |
|---|---|---|---|
| 3,141,019 | 7/1964 | Palazzo et al. | 260/247.5 |
| 3,299,044 | 1/1967 | Cusic et al. | 260/239 |
| 3,502,668 | 3/1970 | Palazzo et al. | 260/247.5 |
| 3,585,209 | 6/1971 | Derappe | 260/307 |
| 3,655,684 | 4/1972 | Osbond et al. | 260/307 G |
| 3,720,685 | 3/1973 | Breuer et al. | 260/307 G |

*Primary Examiner*—G. Thomas Todd
*Attorney, Agent, or Firm*—John J. McDonnell

[57] ABSTRACT

The present invention relates to compounds of the following formula

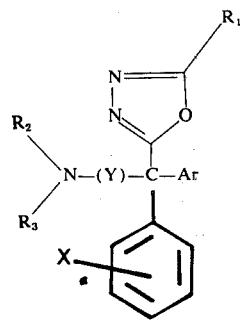

I wherein Y is straight or branched chain alkylene containing 1-4 carbon atoms; $R_1$ is lower alkyl containing 1-7 carbon atoms; X is hydrogen, halo such as fluoro, chloro, bromo or iodo, or lower alkyl containing 1-7 carbon atoms; Ar is phenyl, 2-pyridyl, mono-substituted phenyl, wherein the substituent is halo such as fluoro, chloro, or bromo, or lower alkyl containing 1-7 carbon atoms; and $R_2$ and $R_3$ are lower alkyl containing 1-7 carbon atoms, or $R_2$ and $R_3$ together with N is an azamonocyclic ring selected from the group comprising pyrrolidinyl, piperidino, 4-phenyl-4-hydroxypiperidino, 4-phenyl-4-carboxypiperidino, 4-phenyl-4-carbalkoxypiperidino, or 4-phenyl-4-acetoxypiperidino substituted piperidino and morpholino, or an azabicyclo-alkane containing 6 to 9 carbon atoms and containing at least 5 atoms in each ring of the azabicycloalkane.

15 Claims, No Drawings

1,1-DIARYL-1-OXADIAZOL-ALKYLAMINES

The present invention relates to compounds of the following formula

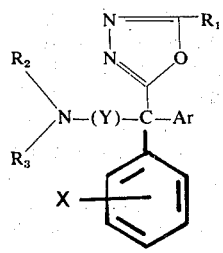

wherein Y is straight or branched chain alkylene containing 1–4 carbon atoms; $R_1$ is lower alkyl containing 1–7 carbon atoms; X is hydrogen, halo such as fluoro, chloro, bromo, iodo, or lower alkyl containing 1–7 carbon atoms; Ar is phenyl, 2-pyridyl, mono-substituted phenyl, wherein the substituent is halo such as fluoro, chloro, bromo or iodo, or lower alkyl containing 1–7 carbon atoms; and $R_2$ and $R_3$ are lower alkyl containing 1–7 carbon atoms, or $R_2$ and $R_3$ together with N is an azamonocyclic ring selected from the group comprising pyrrolidinyl, piperidino, 4-phenyl-4-hydroxypiperidino, 4-phenyl-4-carboxypiperidino, 4-phenyl-4-carbalkoxypiperidino or 4-phenyl-4-acetoxypiperidino substituted piperidino and morpholino, or an azabicycloalkane containing 6 to 9 carbon atoms and containing at least 5 atoms in each ring of the azabicycloalkane. Thus, $R_2$ and $R_3$ together with N is a heterocyclic ring system comprising monocyclic rings of the formula

wherein n is 0, 1 and Z is oxygen, methylene, phenyl hydroxymethylene, phenylcarboxymethylene, phenylcarbalkoxymethylene and bicycloazacycloalkane containing 6 to 9 carbon atoms and containing at least 5 atoms in each ring of the azabicycloalkane.

Preferred embodiments of the present invention as set out in formula I in which $R_2$ and $R_3$ together with N is an azamonocyclic ring selected from the group comprising pyrrolidinyl, piperidino, 4-phenyl-4-carboxypiperidino, 4-phenyl-4-carbalkoxypiperidino, 4-phenyl-4-hydroxypiperidino or acetoxy substituted piperidino, and morpholino are those in which Y is ethylene, propylene, or isopropylene; $R_1$ is methyl or ethyl; Ar is phenyl or 2-pyridyl; and X is hydrogen. Specifically, 5-{[1,1-diphenyl-3-(4-hydroxy-4-phenyl)piperidino]propyl}-2-methyl-1,3,4-oxadiazole, 5-{[1,1-diphenyl-3-(4-acetoxy-4-phenyl)piperidino]propyl}-2-methyl-1,3,4-oxadiazole, 5-[(1,1-diphenyl-3-piperidino)propyl]-2-methyl-1,3,4-oxadiazole, 5-[(1,1-diphenyl-3-morpholino)propyl]-2-methyl-1,3,4-oxadiazole, 5-[(1,1-diphenyl-3-pyrrolidinyl)propyl]-2-methyl-1,3,4-oxadiazole, 5-{[1,1-diphenyl-3-(4-carboxy-4-phenyl)piperidino]propyl}-2-methyl-1,3,4-oxadiazole and the basic salts thereof such as sodium or potassium salts of the acid 5-{[ 1,1-diphenyl-3-(4-carboxy-4-phenyl)piperidino]propyl}-2-methyl-1,3,4-oxadiazole.

Preferred embodiments of the present invention as set out in formula I in which $R_2$ and $R_3$ are lower alkyl containing 1–7 carbon atoms are those in which Y is ethylene, propylene, or isopropylene; $R_1$ is methyl or ethyl; Ar is phenyl or 2-pyridyl; and X is hydrogen. Specifically, 5-{[1,1-diphenyl-3-(dimethylamino)]butyl}-2-methyl-1,3,4-oxadiazole, 5-{[1-phenyl-1-(2-pyridyl)-3-diisopropylamino]propyl}-2-methyl-1,3,4-oxadiazole, and 5-[(1,1-diphenyl-3-diisopropylamino)propyl]-2-methyl-1,3,4-oxadiazole are preferred.

Preferred embodiments of the present invention as set out in formula I in which $R_2$ and $R_3$ together with N is an azabicycloalkane structure containing 6–9 carbon atoms and containing at least 5 atoms in each ring of the azabicycloalkane structure are those wherein Y is ethylene, propylene, isopropylene; $R_1$ is methyl or ethyl; Ar is phenyl or 2-pyridyl; and X is hydrogen. Specifically, 5-{[1,1-diphenyl-3-(2-azabicyclo[2.2.2]oct-2-yl)]propyl}-2-methyl-1,3,4-oxadiazole, 5-[1,1-diphenyl-3-(2-azabicyclo[2.2.2]oct-2-yl)propyl]-2-ethyl-1,3,4-oxadiazole, 5-{[1,1-diphenyl-3-(3-azabicyclo[3.2.2]non-3-yl)]propyl}-2-methyl-1,3,4-oxadiazole, 5-{[1-phenyl-1-(2-pyridyl)-3-(3-azabicyclo[3.2.2]non-3-yl)]propyl}-2-methyl-1,3,4-oxadiazole, 5-{[1,1-diphenyl-3-(7-azabicyclo[2.2.1]hept-7-yl)]propyl}-2-methyl-1,3,4-oxadiazole, 5-{[1,1-diphenyl-3-(6-azabicyclo[3.2.1]oct-6-yl)]propyl}-2-methyl-1,3,4-oxadiazole, 5-{[1-(4-chlorophenyl)-1-(4-methylphenyl)-3-(2-azabicyclo[2.2.2]oct-2-yl)]butyl}-2-methyl-1,3,4-oxadiazole and 5-{[1,1-diphenyl-3-(8-azabicyclo[4.3.0]non-8-yl)]propyl}-2-methyl-1,3,4-oxadiazole are preferred.

The organic bases of this invention form non-toxic, acid-addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

Compounds of the present invention are prepared as set out in Scheme A

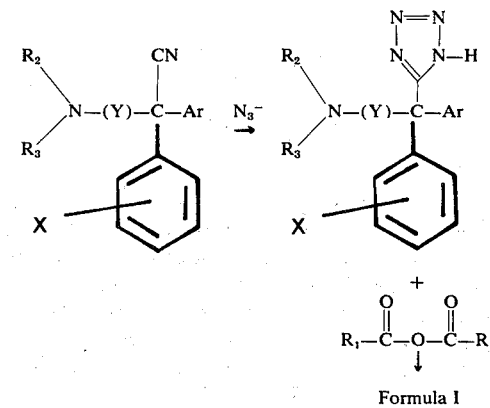

Scheme A

Formula I wherein $R_1$, $R_2$, $R_3$, Ar, Y,X are as defined above. Methods for preparing nitrile precursors are described in U.S. Pat. No. 3,299,044 and include the reaction of an appropriate amine with a halide of the formula

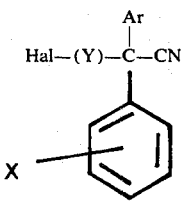

wherein Y, Ar, X are as above and Hal is chlorine or bromine. Alternately, the nitriles can be prepared by the reaction of a diarylacetonitrile of the formula

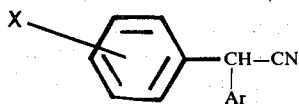

first with sodamide and then with an alkyl halide of the formula

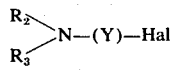

wherein $R_2$, $R_3$, X, Y, Ar, and Hal are as previously described.

1,1-Phenyl substituted amino substituted alkyl nitriles suitable for practicing this invention are described in U.S. Pat. Nos. 3,497,519, 2,841,589, 3,299,044, 2,823,233, 3,225,054 and 3,318,869 and an article by R. Moffett and B. Aspergran, J. Amer. Chem. Soc., 79, 4451 (1957). As shown in Scheme A, treatment of the nitrile with azide ion by methods similar to those described by G. Moersch and D. Morrow, J. Med. Chem., 10, 149 (1967) provides the corresponding tetrazole. Thus, key intermediates in the preparation of compounds of the present invention are tetrazoles of the formula

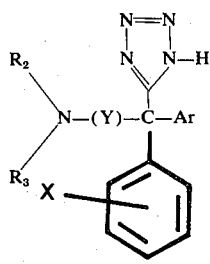

wherein Y is straight or branched chain alkylene containing 1-4 carbon atoms; X is hydrogen, halo such as fluoro, chloro, or bromo, or lower alkyl containing 1-7 carbon atoms; Ar is phenyl, mono-substituted phenyl wherein the substituent is halo such as fluoro, chloro, bromo or iodo, or lower alkyl containing 1-7 carbon atoms; and $R_2$ and $R_3$ are lower alkyl containing 1-7 carbon atoms, and $R_2$ and $R_3$ together with N is an azamonocyclic ring selected from the group comprising pyrrolidinyl, piperidino, 4-phenyl-4-hydroxypiperidino, or 4-phenyl-4-acetoxypiperidino substituted piperidino and morpholino, or an azabicycloalkane containing 6 to 9 carbon atoms and containing at least 5 atoms in each ring of the azabicycloalkane. As shown in Scheme A the tetrazole intermediates are converted to the corresponding 1,3,4-oxadiazole by treatment with an acid anhydride following the procedures substantially as described by R. Huisgen et al., Chem. Ber., 93, 2106 (1960).

For instance, 26.3 parts of 2,2-di-phenyl-4-(2-azabicyclo[2.2.2]oct-2-yl)butyronitrile described in U.S. Pat. No. 3,318,869 is dissolved in 60 parts by volume of dimethylformamide along with 9.0 parts of sodium azide, 7.4 parts of ammonium chloride and 0.12 part of lithium chloride and refluxed for 12 hours. Upon reflux a solid separates which is 5-[1,1-diphenyl-3-(2-azabicyclo[2.2.2]oct-2-yl)propyl)-1H-tetrazole. 11.2 Parts of this tetrazole intermediate and 13.04 parts of acetic anhydride are dissolved in 50 parts by volume of pyridine and refluxed for 2 hours. The solution is cooled and the solid filtered. The filtrate is evaporated to dryness and the residue is slurried in potassium carbonate solution, extracted with methylene chloride, and the methylene chloride extracts are washed with water and dried. Crystallization provides 5-{[1,1-diphenyl-3-(2-azabicyclo[2.2.2]oct-2-yl)]propyl}-2-ethyl-1,3,4-oxadiazole melting at 100°-102°.

Anti-diarrheal utility of the instant compounds is evidenced by their ability to inhibit gastrointestinal mobility as set out in the following test.

CHARCOAL MEAL TEST

Mice weighing 18-24 grams and previously fasted for 18 hours were each given orally 0.3 ml. of a suspension containing 10% charcoal and 5% acacia. The test compounds were administered intragastrically 1 hour prior to the charcoal meal. One-half hour after administration of the meal the mice were sacrificed with ether and their gastrointestinal tracts were removed. The distance over which some of the charcoal meal had moved from the pylorus to the cecum was measured for each mouse and expressed as percentage of the total distance. Each compound was tested at three dose levels (typically, at 0.3, 0.6 and 1.2 mg./mouse) in groups of 5 mice per dose level. Control groups of mice given saline only were run concurrently with each test group.

The anti-arrhythmic utility of the instant compounds is evident from the results of a standardized test for their capacity to slow the ventricular tachycardia induced by aconitine in the isolated rabbit heart. The procedure is essentially that described by Lucchesi, J. Pharmacol. Exp. Therap., 137, 291 (1962), modified in certain particulars as follows: Hearts are obtained from adult albino rabbits of either sex and perfused in apparatus modeled after that devised by Anderson and Craver, J. Pharmacol. Exp. Therap., 93, 135 (1948). Composition of the perfusion solution is the same as Lucchesi's, but the volume is increased to 200 ml. and the temperature lowered to 28°. Aconitine (ordinarily as the nitrate) is administered as soon as the heart beat is regular and the EKG pattern normal, the dose being so selected as to at least double the rate. Typically, 0.05 ml. of 0.1% aconitine nitrate in physiological saline is injected. EKG's are recorded at 5 minute intervals after onset of ventricular tachycardia until two successive readings show stabilization of the rate. Perfusate collected during this time is discarded and replaced with fresh solution q.s. 200 ml. Promptly following stabilization, 2 mg. of compound dissolved or suspended in 1 ml. of physiological saline, is mixed with the perfusion solution. Ten minutes later a like amount is introduced, followed after a further 10 minutes by double the first amount. Final concentration of compound in the perfusion solution is thus 40 mg. per 1. Recording of EKG's is continued at 5 minute intervals throughout this time and for 10 minutes thereafter. A compound is considered anti-arrhythmic if, at any time during the 30 minutes immediately following initial administration in at least half of a minimum of two tests, it reduces by 50% or more the rate recorded ten minutes after onset of tachycardia.

The following examples are presented to further illustrate the present invention. They should not be construed as limiting it either in scope or in spirit. In these examples quantities are indicated in parts by weight unless parts by volume are specified, and temperatures are indicated in degrees Centigrade (°C.).

EXAMPLE 1

26.3 Parts of 2,2-diphenyl-4-(2-azabicyclo[2.2.2]oct-2-yl)butyronitrile described in U.S. Pat. No. 3,318,869 is dissolved in 60 parts by volume of dimethylformamide along with 9.0 parts of sodium azide. 7.4 parts of ammonium chloride and 0.12 part of lithium chloride and refluxed for 12 hours. Upon reflux a solid separates which is 5-[1,1-diphenyl-3-(2-azabicyclo[2.2.2.]oct-2-yl)propyl]-1H-tetrazole. 11.2 Parts of this tetrazole intermediate and 13.04 parts of acetic anhydride are dissolved in 50 parts by volume of pyridine and refluxed for 2 hours. The solution is cooled and the solid filtered. The filtrate is evaporated to dryness and the residue is dissolved in potassium carbonate solution, extracted with methylene chloride, and the methylene chloride extracts are washed with water and dried. Crystallization provides 5-{[1,1-diphenyl-3-(2-azabicyclo[2.2.2]oct-2-yl)]propyl}-2-methyl-1,3,4-oxadiazole, melting at 100°–102° and having the formula

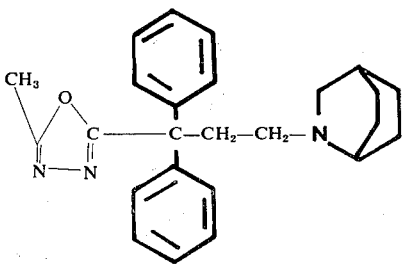

EXAMPLE 2

11.2 Parts of 5-[1,1-diphenyl-3-(2-azabicyclo[2.2.2]oct-2-yl)propyl]-1H-tetrazole is reacted with 13.5 parts of propionic anhydride by the methods described in Example 1 to provide 5-[1,1-diphenyl-3-(2-azabicyclo[2.2.2]oct-2-yl)propyl]-2-ethyl-1,3,4-oxadiazole melting at 96°–98.5° and having the following formula

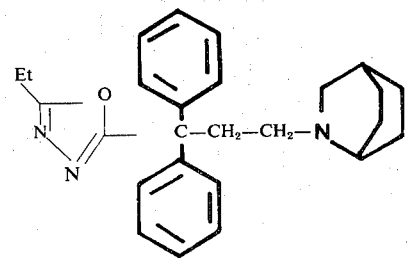

Dissolving 0.9 part of this compound in 0.25 part of 85% phosphoric acid and 30 parts by volume of acetone and removing the solvent by evaporation at reduced pressure gives a slurry which upon recrystallization from methanol provides 5-[1,1-diphenyl-3-(2-azabicyclo[2.2.2]oct-2-yl)propyl]-2-ethyl-1,3,4-oxadiazole phosphate melting at 175°–178° and having the following formula

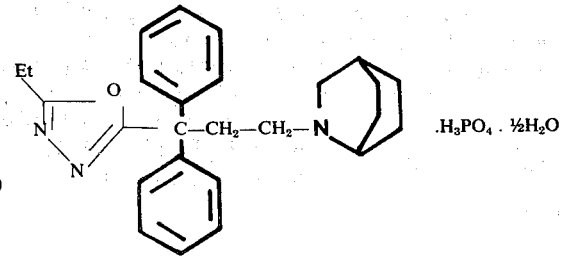

EXAMPLE 3

36 Parts of 2,2-diphenyl-4-(3-azabicyclo[3.2.2]non-3-yl)butyronitrile (U.S. Pat. No. 3,318,864), 9.8 parts of sodium azide, 8.06 parts of ammonium chloride, and 0.15 part of lithium chloride are placed in 50 parts by volume of dimethylformamide and heated at 125° for 12 hours. The solution is cooled and a white solid is filtered off. The solid is washed with dimethylformamide and water and then dried. This procedure provides 5-[1,1-diphenyl-3-(3-azabicyclo[3.2.2]non-3-yl)propyl]-1H-tetrazole melting at 284°–286°.

10.0 Parts of this 1H-tetrazole and 20.5 parts of acetic anhydride are refluxed for 1 hour in 100 parts by volume of pyridine. The solution is cooled and the pyridine is removed by evaporation at reduced pressure. The residue is taken up in ether and the ether solution is then washed with dilute sodium bicarbonate. The ether is then removed by evaporation at reduced pressure and the residual solid is recrystallized from ether-n-pentane and dried in vacuo to provide 5-{[1,1-diphenyl-3-(3-azabicyclo[3.2.2]non-3-yl)]propyl}-2-methyl-1,3,4-oxadiazole, melting at 137°–140°. This compound has the following formula

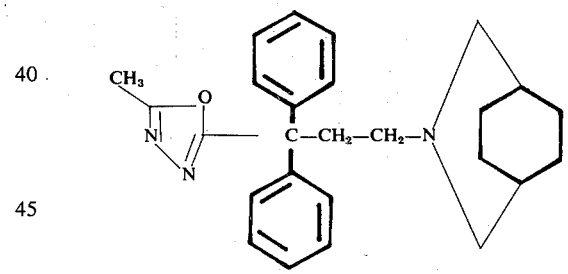

EXAMPLE 4

Using equivalent amounts and following the procedure set out in Example 3, 2-phenyl-2-(2-pyridyl)-4-(3-azabicyclo[3.2.2]non-3-yl)butyronitrile described in U.S. Pat. No. 3,318,869 is converted to 5-{[1-phenyl-1-(2-pyridyl)-3-(3-azabicyclo[3.2.2]non-3-yl)]propyl}-1H-tetrazole, melting at 245°–246°, and this tetrazole is then converted to 5-{[1-phenyl-1-(2-pyridyl)-3-(3-azabicyclo[3.2.2]non-3-yl)]propyl}-2-methyl-1,3,4-oxadiazole, melting at 117.5°–120°. This compound has the following formula

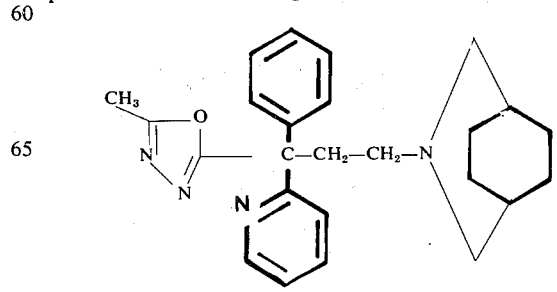

EXAMPLE 5

Using equivalent amounts and following the procedure set out in Example 3, 2-phenyl-2-(2-pyridyl)-4-(3-azabicyclo[3.2.2]non-3-yl)valeronitrile described in U.S. Pat. No. 3,318,869 is converted to 5-{[1-phenyl-1-(2-pyridyl)-4-(3-azabicyclo[3.2.2]non-3-yl)]butyl}-1H-tetrazole which in turn is converted to 5-{[1-phenyl-1-(2-pyridyl)-4-(3-azabicyclo[3.2.2]non-3-yl)]butyl}-2-methyl-1,3,4-oxadiazole. This compound has the following formula

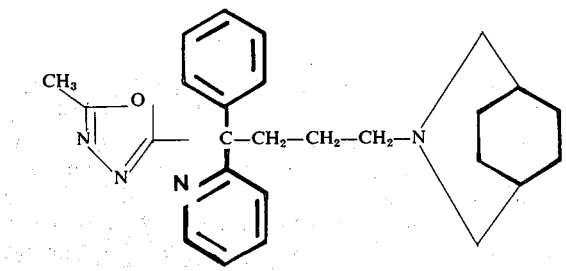

EXAMPLE 6

Using equivalent amounts and following the procedure in Example 3, 2,2-diphenyl-4-(8-azabicyclo[4.3.0]non-8-yl)butyronitrile, described in U.S. Pat. No. 3,318,869, is converted to 5-{[1,1-diphenyl-3-(8-azabicyclo[4.3.0]non-8-yl)]propyl}-1H-tetrazole which is then converted to 5-{[1,1-diphenyl-3-(8-azabicyclo[4.3.0]non-8-yl)]propyl}-2-methyl-1,3,4-oxadiazole. This compound has the following formula

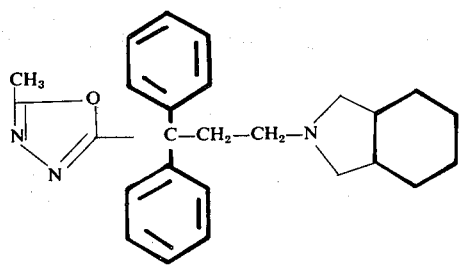

EXAMPLE 7

Using equivalent amounts and following the procedure in Example 3, 2,2-diphenyl-4-(6-azabicyclo[3.2.1]oct-6-yl)butyronitrile described in U.S. Pat. No. 3,318,869 is converted to 5-{[1,1-diphenyl-3-(6-azabicyclo[3.2.1]oct-6-yl)]propyl}-1H-tetrazole which is then converted to 5-{[1,1-diphenyl-3-(6-azabicyclo[3.2.1]oct-6-yl)]propyl}-2-methyl-1,3,4-oxadiazole. This compound has the following formula

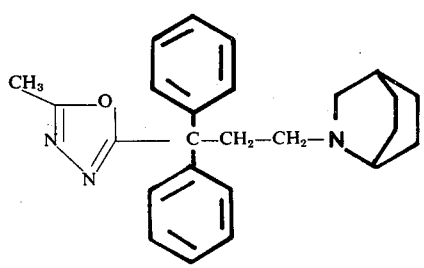

EXAMPLE 8

15 Parts of 2,2-diphenyl-4-bromobutyronitrile are condensed with 12.9 parts of 7-azabicyclo[2.2.1]heptane by reflux in 100 parts by volume of ethylene glycol monomethyl ether. The reaction mixture is cooled and extracted with dilute hydrochloric acid. The aqueous hydrochloric acid extract is made basic with sodium hydroxide solution and extracted with ether. The ether extracts are dried over anhydrous sodium sulfate. Filtration and removal of the ether by evaporation at reduced pressure provides 2,2-diphenyl-4-(7-azabicyclo[2.2.1]hept-7-yl)butyronitrile, melting at 79°–81°. 4.9 Parts of this butyronitrile, 1.5 parts of sodium azide, 1.2 parts of ammonium chloride, and 0.023 part of lithium chloride are placed in 50 parts by volume of dimethylformamide and heated at 125° for 12 hours. The mixture is cooled and the solid is filtered from the dimethylformamide. The solid is washed with dimethylformamide and water. The dried solid is 5-{[1,1-diphenyl-3-(7-azabicyclo[2.2.1]hept-7-yl)]propyl}-1H-tetrazole, melting at 284°–286°.

2.15 Parts of the above tetrazole and 4.9 parts of acetic anhydride are refluxed in 20 parts by volume of pyridine for 1 hour. The reaction mixture is cooled. The pyridine is removed by evaporation at reduced pressure to provide a residue. The residue is taken up in ether. The ether is washed with sodium bicarbonate solution. The ether is then removed to provide a crude product which upon recrystallization from pentane provides 5-{[1,1-diphenyl-3-(7-azabicyclo[2.2.1]hept-7-yl)]propyl}-2-methyl-1,3,4-oxadiazole, melting at 130°–132°. This compound has the following formula

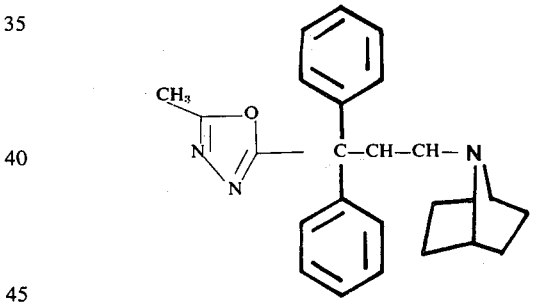

EXAMPLE 9

15 Parts of 2,2-diphenyl-4-bromobutyronitrile, 8.9 parts of 4-hydroxy-4-phenylpiperidine and 400 parts by volume of ethylene glycol monomethyl ether are heated together at reflux for 18 hours under nitrogen. The solution is cooled and the volume is reduced 50% at 60° under reduced pressure. The concentrated mixture is diluted with 1200 parts of water, made basic with sodium hydroxide, and then extracted with ether. The product is isolated from ether by extraction into acid solution followed by making the solution basic and extracting with ether. The dried product is 2,2-diphenyl-4-(4-hydroxy-4-phenyl)piperidinobutyronitrile, melting at 221°–223°.

8.0 Parts of this nitrile, 2.0 parts of sodium azide, 1.6 parts ammonium chloride, 0.030 part of lithium chloride and 20 parts by volume of dimethylformamide are by the method of Example 8 converted to 5-{[1,1-diphenyl-3-(4-hydroxy-4-phenyl)piperidino]propyl}-1H-tetrazole. Also as described in Example 8, 316 parts of the above 1H-tetrazole, 7.1 parts acetic anhydride, and 36 parts by volume of pyridine are converted to 5-{[1,1-diphenyl-3-(4-acetoxy-4-phenyl)piperidino]propyl}-2-methyl-1,3,4-oxadiazole, melting at 157.5°–160°. This compound has the following formula

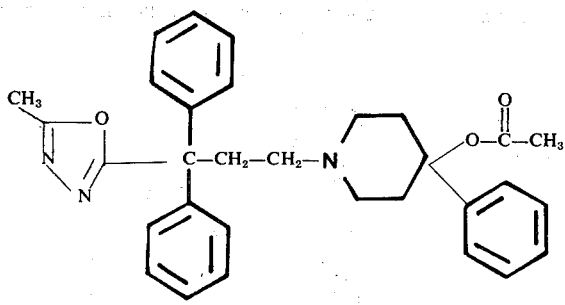

1 Part of the above 4-acetoxy compound is converted to the 4-hydroxy compound by hydrolysis in 55 parts methanol and 15 parts of 20% sodium hydroxide. The product is isolated by evaporating the methanol under reduced pressure, diluting with water, adding sodium hydroxide, and then extracting the product into methylene chloride. After removal of the methylene chloride the product is recrystallized from ether to provide 5-{[1,1-diphenyl-3-(4-hydroxy-4-phenyl)piperidino]propyl}-2-methyl-1,3,4-oxadiazole, melting at 160°–162°. This compound has the following formula

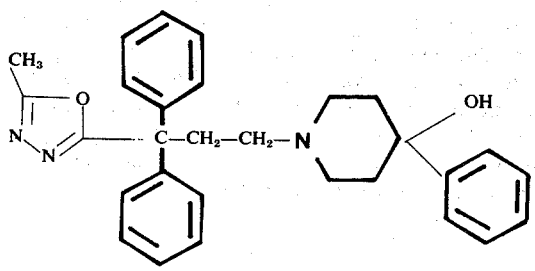

EXAMPLE 10

Using equivalent parts and following the procedure set out in Example 9, 2,2-diphenyl-4-(4-carbethoxy-4-phenyl)piperidinebutyronitrile described in U.S. Pat. No. 3,497,519 is converted to 5-{[1,1-diphenyl-3-(4-carbethoxy-4-phenyl)piperidino]propyl}-1H-tetrazole. Also according to Example 9, and using equivalent parts, the 1H-tetrazole is converted to 5-{[1,1-diphenyl-3-(4-carbethoxy-4-phenyl)piperidino]propyl}-2-methyl-1,3,4-oxadiazole. This compound has the following formula

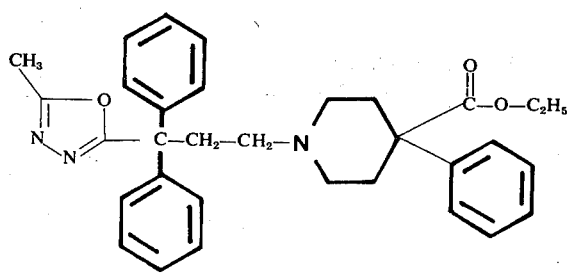

Hydrolysis of 1 part of this ester in 50 parts of methanol containing 15 parts of 20% aqueous sodium hydroxide and isolation provides

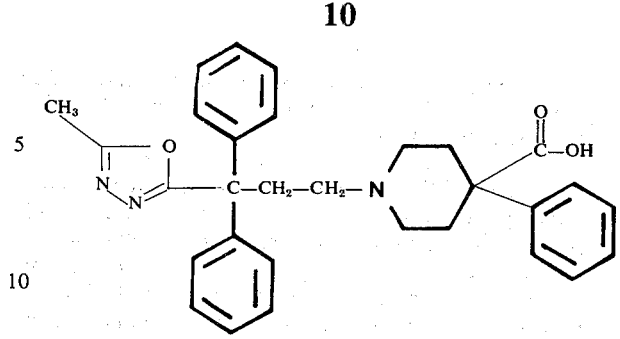

EXAMPLE 11

Following the procedures set out in Example 1, 36.5 parts of 2,2-diphenyl-4-diisopropylaminobutyronitrile (U.S. Pat. No. 2,823,233), 7.95 parts of ammonium chloride, 9.75 parts sodium azide, and 0.15 part of lithium chloride in 75 parts by volume of dimethylformamide are converted to 5-{[1,1-diphenyl-3-(diisopropylamino)]propyl}-1H-tetrazole, melting at 272°–274°. Also following the procedures set out in Example 1, 1.2 parts of the 1H-tetrazole is reacted with 1.1 parts of acetyl chloride in 10 parts by volume of pyridine to provide 5-{[1,1-diphenyl-3-diisopropylamino]propyl}-2-methyl-1,3,4-oxadiazole, melting at 91°–92°. This compound has the following formula

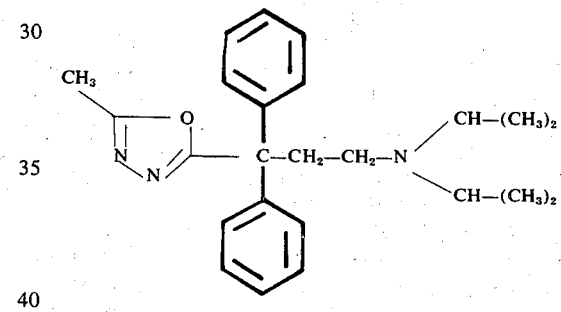

EXAMPLE 12

Following the procedures set out in Example 1, 16.8 parts of 2,2-diphenyl-3-methyl-4-dimethylaminobutyronitrile (U.S. Pat. No. 2,823,233), 5.3 parts of sodium azide, 4.3 parts of ammonium chloride, and 0.3 part of lithium chloride in 40 parts by volume of dimethylformamide are converted to 5-{[1,1-diphenyl-3-methyl-3-dimethylamino]propyl}-1H-tetrazole hydrochloride, melting at 281°–282°. Also following the procedures of Example 1, 4.0 parts of the 1H-tetrazole free base and 4.9 parts of acetyl chloride in 40 parts by volume of pyridine are reacted to provide 5-{[1,1-diphenyl-3-dimethylamino]butyl}-2-methyl-1,3,4-oxadiazole hydrochloride, melting at 198°–204°. This compound has the following formula

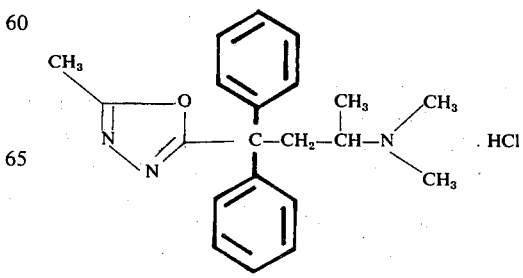

EXAMPLE 13

Following the procedures set out in Example 1, 26.6 parts of 2-phenyl-2-(2-pyridyl)-4-diisopropylaminobutyronitrile is reacted with 7.95 parts of ammonium chloride, 9.75 parts of sodium azide, and 0.15 part of lithium chloride in 75 parts by volume of dimethylformamide to provide 5-{[1-phenyl-1-(2-pyridyl)-3-diisopropylamino]propyl}-1H-tetrazole hydrochloride. Also following the procedure in Example 1, 1.1 parts of the above tetrazole is reacted with 1.15 parts of acetyl chloride in 10 parts by volume of pyridine to provide 5-{[1-phenyl-1-(2-pyridyl)-3-diisopropylamino]propyl}-2-methyl-1,3,4-oxadiazole, melting at 65°–67°. This compound has the following formula

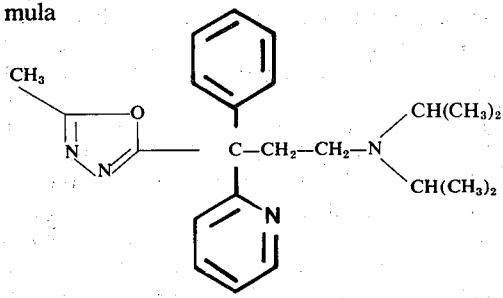

EXAMPLE 14

Following the procedures set out in Example 1, 26.6 parts of 2-phenyl-2-(p-chlorophenyl)-4-piperidinobutyronitrile (U.S. Pat. No. 2,823,233), is reacted with 7.95 parts of ammonium chloride, 9.75 parts of sodium azide and 0.15 part of lithium chloride in 75 parts by volume of dimethylformamide to provide 5-{[1-phenyl-1-(p-chlorophenyl)-3-piperidino]propyl}-1H-tetrazole hydrochloride. Also following the procedures in Example 1, 1.1 parts of the above tetrazole is reacted with 1.15 parts of acetyl chloride in 10 parts by volume of pyridine to provide 5-{[1-phenyl-1-(p-chlorophenyl)-3-piperidino]propyl}-2-methyl-1,3,4-oxadiazole. This compound has the following formula

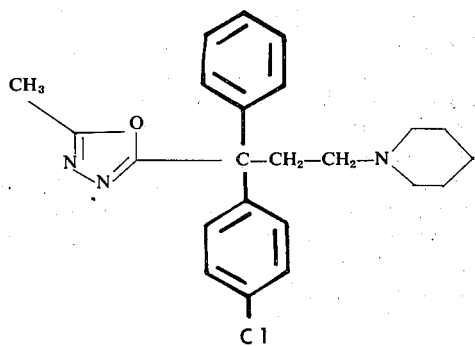

EXAMPLE 15

Following the procedures set out in Example 1, 26.6 parts of 4-diisopropylamino-2-(3-tolyl)-2-(2-pyridyl)-butyronitrile, described in U.S. pat. No. 3,225,054, is reacted with 7.95 parts of ammonium chloride, 9.75 parts of sodium azide, and 0.15 part of lithium chloride in 75 parts by volume of dimethylformamide to provide 5-{[1-(3-tolyl)-1-(2-pyridyl)-3-diisopropylamino]propyl}-1H-tetrazole hydrochloride. Also following the procedures in Example 1, 1.1 parts of the above tetrazole is reacted with 1.15 parts of acetyl chloride in 10 parts by volume of pyridine to provide 5-{[1-(3-tolyl)-1-(2-pyridyl)-3-piperidino]propyl}-2-methyl-1,3,4-oxadiazole. This compound has the following formula

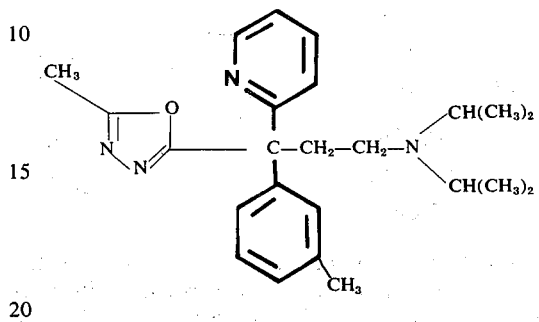

EXAMPLE 16

Following the procedures set out in Example 1, 26.6 parts of 2-(2-pyridyl)-2-(p-fluorophenyl)-4-diisopropylbutyronitrile, U.S. Pat. No. 3,225,054, is reacted with 7.95 parts of ammonium chloride, 9.75 parts of sodium azide, and 0.15 part of lithium chloride in 75 parts by volume of dimethylformamide to provide 5-{[1-(2-pyridyl)-1-(p-fluorophenyl)-3-diisopropylamino]propyl}-1H-tetrazole hydrochloride. Also following the procedures in Example 1, 1.1 parts of the above tetrazole is reacted with 1.15 parts of acetyl chloride in 10 parts by volume of pyridine to provide 5-{[1-(2-pyridyl)-1-(p-fluorophenyl)-3-diisopropylamino]propyl}-2-methyl-1,3,4-oxadiazole. This compound has the following formula

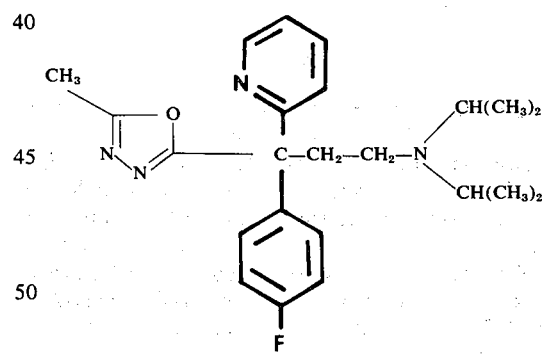

What is claimed is:
1. A compound of the formula

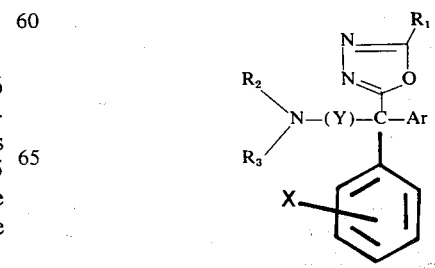

and acid addition salts thereof wherein Y is alkylene containing 1–4 carbon atoms; $R_1$ is lower alkyl; X is hydrogen, halo or lower alkyl; Ar is phenyl, halo-substituted phenyl, lower alkyl substituted phenyl, or 2-pyridyl; and $R_2$ and $R_3$ are lower alkyl, or $R_2$ and $R_3$ together with N is a heterocyclic ring system consisting of azamonocyclic ring of the formula

wherein n is 0 or 1 and Z is oxygen, methylene, phenylhydroxymethylene, phenylcarboxymethylene, phenylcarbloweralkoxymethylene or azabicycloalkane containing 6 to 9 carbon atoms and containing at least 5 atoms in each ring of the azabicycloalkane.

2. As in claim 1, a compound of the formula

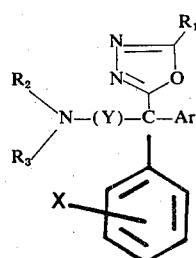

and acid addition salts thereof wherein Y is alkylene; $R_1$ is lower alkyl; X is hydrogen, halo, or lower alkyl; Ar is phenyl, halo-substituted phenyl, lower alkyl substituted phenyl, or 2-pyridyl; and $R_2$ and $R_3$ are lower alkyl.

3. As in claim 1, a compound of the formula

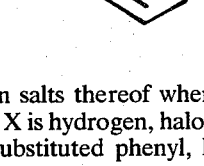

and acid addition salts thereof wherein Y is alkylene; $R_1$ is lower alkyl; X is hydrogen, halo, or lower alkyl; Ar is phenyl, halo-substituted phenyl, lower alkyl substituted phenyl, or 2-pyridyl; and $R_2$ and $R_3$ together with N is a heterocyclic ring system consisting of azamonocyclic rings of the formula

wherein n is 0 or 1 and Z is oxygen, methylene, phenylhydroxymethylene, phenylcarboxymethylene, phenylcarbalkoxymethylene and bicycloazacycloalkane containing 6 to 9 carbon atoms and containing at least 5 atoms in each ring of the azabicycloalkane.

4. As in claim 1, a compound of the formula

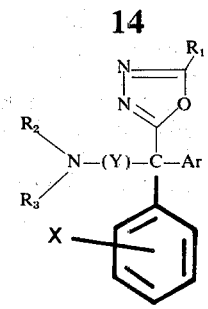

and acid addition salts thereof wherein Y is alkylene; $R_1$ is lower alkyl; X is hydrogen, halo, or lower alkyl; Ar is phenyl, halo-substituted phenyl, lower alkyl substituted phenyl, or 2-pyridyl; and $R_2$ and $R_3$ together with N is a heterocyclic ring system consisting of azamonocyclic ring of the formula

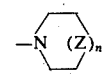

wherein n is 0 or 1 and Z is oxygen, methylene, phenylhydroxymethylene, phenylcarboxymethylene or phenylcarbalkoxymethylene.

5. As in claim 1, a compound of the formula

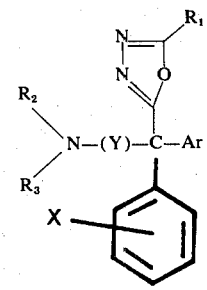

and acid addition salts thereof wherein Y is alkylene; $R_1$ is lower alkyl; X is hydrogen, halo, or lower alkyl; Ar is phenyl, halo-substituted phenyl, lower alkyl substituted phenyl, or 2-pyridyl; and $R_2$ and $R_3$ together with N is a heterocyclic ring system consisting of bicycloazacycloalkanes containing 6 to 9 carbon atoms and containing at least 5 atoms in each ring of the azabicycloalkane.

6. As in claim 1, the compound which is 5-{[1,1-diphenyl-3-(2-azabicyclo[2.2.2]oct-2-yl)]propyl}-2-methyl-1,3,4-oxadiazole.

7. As in claim 1, the compound which is 5-{[1,1-diphenyl-3-(dimethylamino)]butyl}-2-methyl-1,3,4-oxadiazole.

8. As in claim 1, the compound which is 5-{[1-phenyl-1-(2-pyridyl)-3-diisopropylamino]propyl}-2-methyl-1,3,4-oxadiazole.

9. As in claim 1, the compound which is 5-[(1,1-diphenyl-3-diisopropylamino)propyl]-2-methyl-1,3,4-oxadiazole.

10. As in claim 1, the compound which is 5-[1,1-diphenyl-3-(2-azabicyclo[2.2.2]oct-2-yl)propyl]-2-ethyl-1,3,4-oxadiazole.

11. As in claim 1, the compound which is 5-{[1,1-diphenyl-3-(4-acetoxy-4-phenyl)piperidino]propyl}-2-methyl-1,3,4-oxadiazole.

12. As in claim 1, the compound which is 5-{[1,1- diphenyl-3-(4-hydroxy-4-phenyl)piperidino]propyl}-2-methyl-1,3,4-oxadiazole.

13. As in claim 1, the compound which is 5-{[1,1-diphenyl-3-(7-azabicyclo[2.2.1]hept-7-yl)]propyl}-2-methyl-1,3,4-oxadiazole.

14. As in claim 1, the compound which is 5-{[1,1-diphenyl-3-(3-azabicyclo[3.2.2]non-3-yl)]propyl}-2-methyl-1,3,4-oxadiazole.

15. As in claim 1, the compound which is 5-{[1-phenyl-1-(2-pyridyl)-3-(3-azabicyclo[3.2.2]non-3-yl)]propyl}-2-methyl-1,3,4-oxadiazole.

* * * * *